US008791780B2

(12) United States Patent
Boban et al.

(10) Patent No.: US 8,791,780 B2
(45) Date of Patent: Jul. 29, 2014

(54) HYDRAULIC TRANSMISSION VALVE

(75) Inventors: Drazen Boban, Nuertingen (DE); Bernd Franz, Stuttgart (DE); Thomas Jacob, Stuttgart (DE); Andreas Knecht, Kusterdingen (DE); Dieter Maisch, Kohlberg (DE); Hartmut Weber, Altdorf (DE)

(73) Assignee: Hillte Germany GmbH, Marktheidenfeld (DE)

( * ) Notice: Subject to any disclaimer, the term of this patent is extended or adjusted under 35 U.S.C. 154(b) by 19 days.

(21) Appl. No.: 13/549,441

(22) Filed: Jul. 14, 2012

(65) Prior Publication Data

US 2013/0181156 A1    Jul. 18, 2013

(30) Foreign Application Priority Data

Aug. 26, 2011 (DE) .......................... 10 2011 053 023

(51) Int. Cl.
*H01F 3/00* (2006.01)
*H01F 3/08* (2006.01)
*H01F 7/127* (2006.01)
*H01F 7/08* (2006.01)
*H01F 7/13* (2006.01)

(52) U.S. Cl.
CPC ................. *H01F 7/08* (2013.01); *H01F 7/127* (2013.01); *H01F 2007/085* (2013.01); *H01F 7/13* (2013.01)
USPC ............................ 335/281; 335/279; 335/280

(58) Field of Classification Search
CPC ........................ H01F 2007/086; H01H 50/16
USPC .................................................. 335/279–281
See application file for complete search history.

(56) References Cited

U.S. PATENT DOCUMENTS

| | | | | | |
|---|---|---|---|---|---|
| 2,452,079 | A | * | 10/1948 | Stacy ............................. | 335/239 |
| 3,479,627 | A | * | 11/1969 | Underwood .................... | 335/271 |
| 3,577,107 | A | * | 5/1971 | Widl et al. ..................... | 335/248 |
| 4,468,647 | A | * | 8/1984 | Gibas ............................. | 335/262 |
| 4,518,938 | A | * | 5/1985 | Bartholomaus et al. ....... | 335/262 |
| 5,071,267 | A | * | 12/1991 | Aldefeld .................... | 400/124.17 |
| 6,601,822 | B2 | * | 8/2003 | Tachibana et al. ......... | 251/129.15 |
| 6,929,242 | B2 | * | 8/2005 | Kirsch et al. .............. | 251/129.15 |
| 7,874,541 | B2 | * | 1/2011 | Abe et al. .................. | 251/129.15 |
| 8,109,487 | B2 | * | 2/2012 | Kokubu et al. ............ | 251/129.15 |
| 8,154,370 | B2 | * | 4/2012 | Ishibashi ...................... | 335/220 |
| 8,228,149 | B2 | * | 7/2012 | Puth et al. ..................... | 335/229 |
| 2011/0115587 | A1 | * | 5/2011 | Ishibashi ...................... | 335/255 |

FOREIGN PATENT DOCUMENTS

| | | | |
|---|---|---|---|
| DE | 198 08 279 A1 | | 9/1999 |
| DE | 10 2009 042 888 A1 | | 3/2011 |
| GB | 000925132 A | * | 5/1963 |

* cited by examiner

*Primary Examiner* — Mohamad Musleh
(74) *Attorney, Agent, or Firm* — Von Rohrscheidt Patents

(57) ABSTRACT

The invention relates to a hydraulic transmission valve with a magnetizable housing which is integrally configured in one piece with a pole core cone. The transmission valve according to the invention facilitates comfortably coupling in particular startup clutches, shifting clutches or synchronization clutches in a friction locking manner. Still using a transmission valve of this type is facilitated for fewer to no transmission oil changes. Furthermore a transmission valve of this type can also be used in countries with inferior transmission oil quality. The housing includes a connection. The connection defines an anchor stroke and a concentric arrangement between the pole core cone and a pole tube. Thus, the pole tube is fixated the magnetizable pole flange. An anchor that is exclusively supported in the pole tube is magnetically separated from the pole tube through a separation layer with a thickness of 0.01 mm to 0.06 mm.

19 Claims, 3 Drawing Sheets

HYDRAULIC TRANSMISSION VALVE

RELATED APPLICATIONS

This application incorporates by reference and claims priority from German Patent Application DE 10 2011 053 023.1 filed on Aug. 26, 2011.

FIELD OF THE INVENTION

The invention relates to a hydraulic transmission valve according to patent claim 1.

BACKGROUND OF THE INVENTION

A hydraulic valve is already known from DE 198 08 279 A1. The valve includes a plastic housing. The plastic housing is injection molded about a magnetically conductive insert bushing. A pole core with a pole core cone is inserted into the combination including the plastic housing and the insert bushing. A plastic component that is designated as a base is inserted into the insert bushing, wherein the plastic component is injection molded about a pot base of a pot shaped pole tube. A disc shaped pole flange is placed onto the pole tube in the area of the pot base. In the pole tube, an anchor is arranged movable in axial direction. A piston is inserted into the anchor, wherein the piston is supported in a hydraulic bushing which is configured in one piece with the pole core.

From DE 10 2009 042 888 A1, a proportional valve is already known whose pole core cone, designated as control cone, has a trumpet shape. The pole tube designated as steel sleeve includes a separation layer which can be a low friction lacquer, PTFE or a nickel-PTFE coating.

BRIEF SUMMARY OF THE INVENTION

Thus, it is an object of the invention to provide a transmission valve for transmission clutches that are configured to be comfortably coupled through friction locking, in particular startup clutches, shifting clutches or synchronization clutches, wherein the transmission valve only requires few transmission oil changes or no transmission oil changes at all. Furthermore, the transmission valve shall also be usable in countries with low transmission oil quality. This object is achieved according to the invention through a hydraulic transmission valve including a magnetizable housing integrally formed in one piece with a pole core cone, wherein the housing includes a connection, wherein the connection defines an anchor stroke and a concentric arrangement between the pole core cone and a pole tube, wherein the pole tube is fixated at a magnetizable pole flange, wherein an anchor that is only supported in the pole tube is magnetically separated from the pole tube through a separation layer with a thickness of 0.1 mm to 0.06 mm.

In order to be fail safe for long transmission oil change intervals, in the extreme service life duration filling, the transmission valve must be very robust. A high level of robustness can be achieved through large clearances of the moving components; however, this affects control quality negatively.

The transmission valve according to the invention achieves these contrary objectives in that it has a high level of robustness and a high control quality. The high level of robustness is achieved in that contaminant particles in the hydraulic oil cannot lead to a jamming of the transmission valve since the anchor can generate axial forces that are large enough so that the anchor can always pull clear.

In spite of that, the transmission valve still has high control quality which is achieved through plural design measures. Thus, in particular, the transversal forces between the anchor and a pole tube are minimized.

A configurative feature of this type for reducing the transversal forces is a very tight operating clearance between the anchor and the pole tube which is achieved through a very thin separation layer instead of a sleeve or a thick coating. A very thin separation layer of this type is provided with a layer thickness of 0.01 mm to 0.06 mm. The thin separation layer can be produced through a chemical or galvanic process. For a chemical process, for example, chemical nickel plating can be used. Thus a layer thickness of 0.045 mm has proven ideal. The minimum thickness of 0.01 mm is theoretically feasible. With the currently used methods, a layer thickness starting at 0.02 mm has proved feasible. Contrary to galvanic nickel plating, no voltage is applied through electrodes in a chemical process. For chemical nickel plating, the layer thickness is very homogeneous.

The anchor can be coated at its enveloping surface, this means at its running surface. Thus, chemical nickel plating provides a very high wear and corrosion protection. Alternatively, the pole tube can also be coated on an inside.

When the pole tube is configured with a magnetizable base, which directly contacts the anchor, a separation measure also has to be provided at this location in order to prevent magnetic bonding. This separation measure can be the same separation layer as the separation layer at the jacket surface. Consequently, also the rear face of the anchor or the inner base of the pole tube can be galvanically or chemically coated.

In order to provide proportional properties of the transmission valve, a pole core cone is provided. With a pole core cone of this type, however, also various other force/distance diagrams are implementable. The linear force/distance diagram, however, is typically desirable to facilitate control.

Due to the low and furthermore constant distance between the pole tube and the anchor, very small pivot moments are imparted upon the anchor and the anchor thus only has few transversal forces which otherwise would increase friction and thus the hysteresis $\Delta p$ described in further detail in the embodiment.

In order to keep the transversal forces small, also the pole core cone has to be aligned with good concentricity relative to the anchor and the pole tube. For this purpose, the invention provides that the pole core cone and the housing are integrally fabricated from one piece of magnetizable metal. Furthermore, the housing includes a connection in which a magnetizable pole flange of the pole tube is supported. This connection defines an anchor stroke of the anchor and a concentric arrangement between the pole core cone and the pole tube.

In order to precisely define anchor stroke in an advantageous embodiment, the pole flange can include a face for axial fit, wherein the face contacts a contact face of the housing.

In order to provide concentricity between the pole tube and the pole core cone, the pole flange can have a radial fit.

The radial fit and the axial fit are also joinable in a common fit. For example, the pole flange can be configured in a conical manner on the radial outside so that a conical joint is provided towards the housing. In this case, the adjustment of the anchor stroke, however, is more complex.

The pole tube in any case is fixated at the pole flange so there is no relative movement. In particular the magnetizable pole flange can be configured in one piece with the pole tube. However, it is also feasible to provide the pole flange as a disc and to press it onto the pole tube. Subsequently thereto, the unit including the disc and the pole flange can be turned or ground. Thus, the connection between the housing and the pole flange solely or substantially determines the coaxial positioning between the pole tube and the pole core cone. When this connection process has repeatable quality with small tolerances, also the pole tube and the pole core cone can be produced coaxial or aligned with one another in large numbers. The anchor run in the pole tube can be moved into the pole core cone without transversal forces loading this movement with friction.

In order for a wedging or friction between the anchor and the pole core cone occurring under no circumstance, the inner diameter of the pole core cone can be additionally configured larger than the inner diameter of the pole tube.

Between the pole core cone and the pole tube, a sleeve can be provided. The sleeve can be configured with a centering function. Then, however, the sleeve has to be configured accordingly thick since, according to the invention, however, the connection between the housing and the pole flange provides the coaxial arrangement between the pole tube and the pole core cone, a sleeve of this type can either be omitted or a sleeve of this type is configured accordingly thin so that it does not have a centering effect. Not having a centering effect means that the forces introduced during assembly at the connection between housing and pole flange are large enough so that the assembly process would deform the thin sleeve for alignment errors anyhow. The function of a thin sleeve of this type then is to seal the space within the sleeve relative to the space outside the sleeve. Within the sleeve, the anchor is moved in the hydraulic oil. Outside of the sleeve, the coil is provided for moving the anchor. Depending on the embodiment of the transmission valve, the coil is in air, hydraulic oil or in an air-/hydraulic-oil mix. Thus, the sleeve can be used to protect the electromagnetic component against the hydraulic oil. Hydraulic oil cannot exit at the contacts to the electrical conductors.

Also for the transmission valves illustrated in the embodiments, whose electromagnetic components are disposed in hydraulic oil anyhow, a sleeve of this type can make sense. Thus, it is the function of the sleeve to minimize air inclusions in the hydraulic oil within the electromagnetic portion. Air inclusions of this type can otherwise negatively influence the hydraulic damping during sliding the anchor back and forth. The sleeve seals the cavity outside the sleeve and an annular cavity axially between the pole core cone and the pole tube only in an insufficient manner against a flow through of hydraulic oil. However, the sleeve prevents that air can collect within the sleeve when filling the electromagnetic portion with hydraulic oil through the transversal borehole. Air of this type can namely form about the coil, but is kept outside through the sleeve. Thus, an initial check of the transmission valve can be performed under realistic ambient conditions and with a realistic damping.

Namely a hydraulic damping is important for the controllability of the transmission valve. Simultaneously the hydraulic oil has to be moved back and forth between the two cavities axially in front of the anchor and axially behind the anchor in order to provide movability for the anchor. Thus, a hydraulic pass through is provided between the two axial faces of the anchor. This pass through includes a center recess in the anchor, which pass through keeps the transversal forces small due to the centricity of the recess. Furthermore, a throttle orifice can be provided in an advantageous embodiment in the portion of the pass through. A short throttle orifice of this type facilitates a relatively temperature independent determination of the hydraulic damping with respect to long boreholes. The throttle orifice can be advantageously integrated in a non-magnetizable anti-stick disc. Due to the non-magnetizable properties of the anti-stick disc, there are no transversal forces even when the throttle orifice is arranged eccentric, this means outside of the longitudinal axis of the anchor. Thus, an eccentrical arrangement of the throttle orifice is advantageous since the anti-stick disc can thus be configured closed in the center and can form a central contact surface for a plunger. Thus, the center pass-through in the anchor can be closed for center support of the plunger. The hydraulic portion is actuatable through the plunger. The plunger can be advantageously configured with a hydraulic piston.

In order to cause high axial forces of the plunger, a hydraulic bushing of the transmission valve is advantageously configured magnetizable and forms the pole core together with the pole core cone.

In order to positively influence the force/distance diagram, the pole tube can be configured with a pole tube cone analogous to the pole core.

Other advantages of the invention can be derived from the patent claims, the description and the drawing.

BRIEF DESCRIPTION OF THE DRAWINGS

The invention is subsequently described in more detail based on two embodiments with reference to a drawing figure, wherein:

FIG. 1 illustrates a hydraulic valve 1 in a basic position. The hydraulic valve is a pressure regulation valve.

Figure 1:
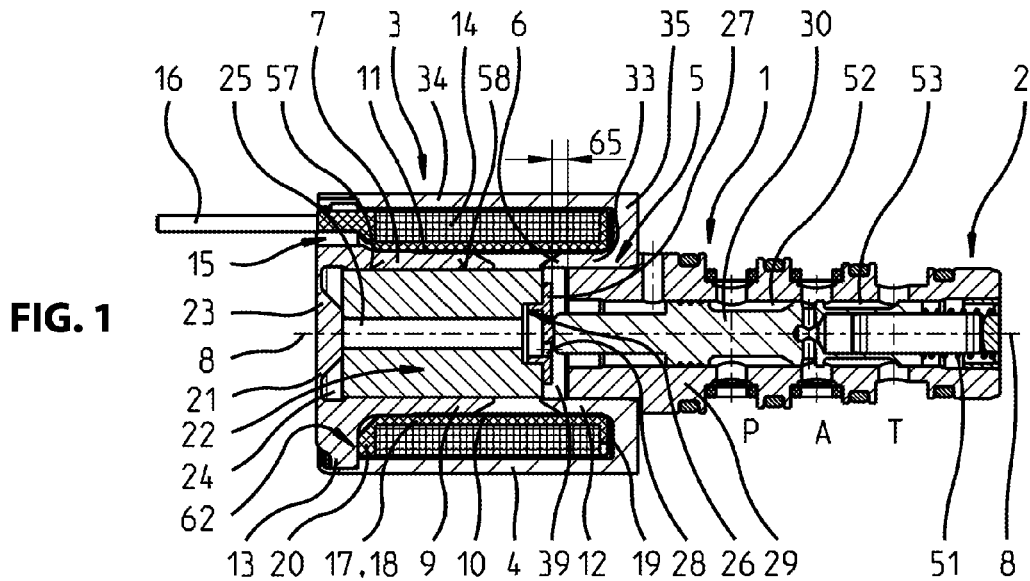
FIG. 1 illustrates a hydraulic transmission valve in a basic position.

This transmission valve 1 is used in a twin clutch transmission. The transmission valve 1 controls the twin clutch. Thus, hydraulic bushings 29 of hydraulic portions 2 of plural transmission valves which are configured partially similar are inserted into a control plate of the twin clutch transmission. The hydraulic bushings 29 are configured as turned components. Electromagnet components 3 of the transmission valves 1 respectively connected with the hydraulic components 2 protrude from the control plate and are embedded in oil. Each of the electromagnetic components includes a magnetically conductive housing 4. The housing 4 is integrally configured in one piece with the pole core cone 5. An annular bar 33 runs to this pole core cone 5. The annular bar 33 extends in a coaxial manner to a longitudinal axis 8 of the transmission valve 1 into the direction oriented towards the center of the electromagnetic component 3. The pole core cone 6 is essentially opposed in a mirror symmetrical manner to a pole tube cone 9 of a pole tube 7. An imaginary mirror plane thus extends perpendicular to the longitudinal axis 8. The pole tube 7 is configured as a turned component. The housing 4 is pre-forged and turned in the connection portion.

A magnetically non-conductive sleeve 10 is placed on the one hand side onto the annular bar 33 and on the other hand side onto the pole tube 7. Due to the thin walls of the sleeve 10, the sleeve 10 does not center. The necessary centering of the pole core cone 9 relative to the pole tube 7 is performed instead through a connection 62 at the housing 4. In order to receive the sleeve 10, the pole tube 7 and also the annular bar 33 include portions 11, 12 that are turned on the radial outside.

A pole flange 13 extends in radially outward direction from the pole tube 7 at the rear portion of the electromagnetic component, wherein the pole flange is integrally configured in one piece with the pole tube 7. The housing 4 is curled about the pole flange 13 so that the pole flange 13 is axially supported in both directions at the housing 4. Consequently, the connection 62 is formed at this location. The connection 62 determines an anchor stroke 65. Furthermore, this connection 62 defines a concentricity between the pole core cone 9 and the pole tube 7.

The connection 62 includes an axial fit 61 and a radial fir 60. The pole flange 13 includes a face 63 for providing an axial fit 61, wherein the face 63 contacts a contact surface 64 of the housing 4 that is aligned perpendicular to a longitudinal axis 8 of the transmission valve 1. In order to provide a radial fit 60, the pole flange 13 has an enveloping surface 66. Thus, the pole flange 13 is inserted into a cylindrical recess 67 of the housing 4.

The contact surface 64 of the housing 4 has to be rather precisely orthogonal to the longitudinal axis 8 of the housing 4. By the same token, the face 63 of the pole flange 13 has to be highly rectangular relative to the longitudinal axis 8 of the pole tube 7. The longitudinal axes 8 of the pole tube 7 and of the housing 4 coincide in the illustrated mounted condition.

The pole flange 13 includes recesses 15 through which electrical conductors 16 are run for applying a voltage to a coil 14. This coil 14 is defined on a radial inside by a support element 17 made from plastic material. The support element 17 thus includes a U-shaped profile. Consequently, a disc shaped collar extends in radially outward direction from a radial inner portion 18 of the support element 17 at a front end of the support element 17. Furthermore, a disc shaped collar 20 also extends in radially outward direction from the radially inner portion 18 of the support element 17 at a rear end of the support element 17. The radially inner portion 18 is placed onto the sleeve 10. The forward collar 19 is adjacent to the housing 5. The rear collar 20 is adjacent to the pole flange 13.

The pole flange 13 is configured closed on the radial inside so that a base 21 is formed which closes the pole tube 7 at a rear end of the pole tube. Thus, a stop 23 protrudes into the pole tube 7. In this basic position, this stop 23 contacts the anchor 22 with its rear face 58. An annular receiver cavity 24 for hydraulic oil is formed about the stop 23.

The anchor 22 includes a central borehole 25. The central borehole 25 is expanded with a shoulder at the front end of the anchor 22 into a borehole 26 with larger diameter. An anti-stick disc 27 is inserted into this larger borehole 26, wherein the anti-stick disc has a small opening 28 that is arranged eccentric to the longitudinal axis 8. This small opening 28 has the function of a throttle orifice.

Figure 3:
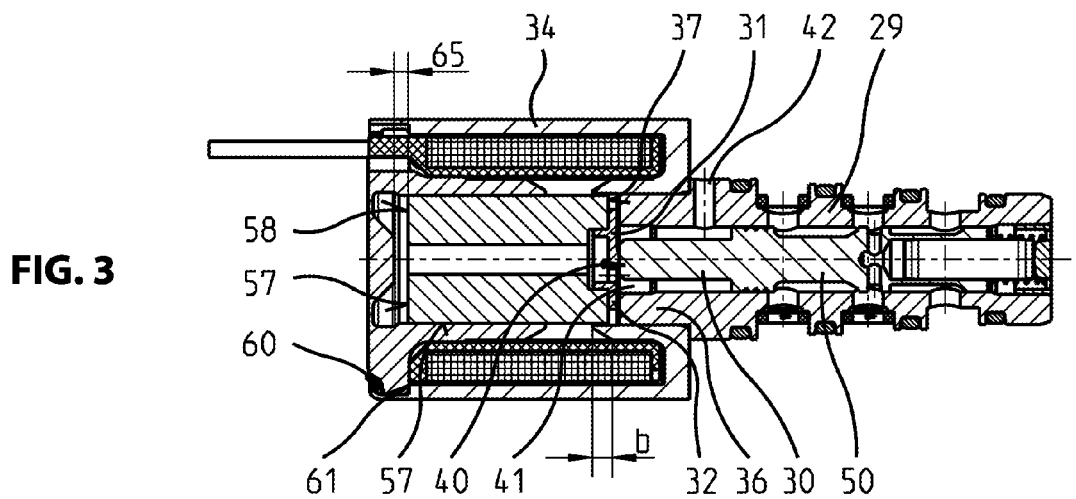
FIG. 3 illustrates the hydraulic transmission valve in a contact position.

In the portion of the anti-stick disc 27, which portion is configured to prevent a sticking of the anchor 22 at the magnetically conductive hydraulic bushing 29 of the hydraulic component 2, for the fully retracted anchor illustrated in FIG. 3, the portion 27 is configured as a disc 32. This disc 32 extends from a radially inner contact portion 31 for a plunger 30. The magnetically conductive hydraulic bushing 29 thus forms a pole core 5 together with the annular bar 30 leading to the pole core cone 6.

The magnetic flux which pulls the anchor 22 in the direction axially oriented towards the pole core 5 when the coil 14 is loaded with current runs as follows:
from the anchor 22 to
the pole tube 7 with the pole tube cone 9,
the flange shaped pole flange 13,
an outer shell 34 of the housing 4,
a radially inward oriented housing component 35,
the annular bar 33,
the pole core cone 6, and back
to the anchor 22.

Thus the annular bar 33 acts with the pole core cone 6 and a pinion 36 of the hydraulic bushing 29 that is inserted into the annular bar 33 as a joint pole core 5. Consequently, a very high axial force pulls at the anchor 22, wherein the axial force has a rather linear effect since the anchor 22 in its basic position according to FIG. 1 has already penetrated into the pole core cone with a dimension a=0.2 mm. For the contact of the anti-stick disc 27 at the hydraulic bushing 29 illustrated in FIG. 3, the forward face 37 of the anchor 22 has not exceeded the axial cone length b of the pole core cone 6 yet.

Figure 2:
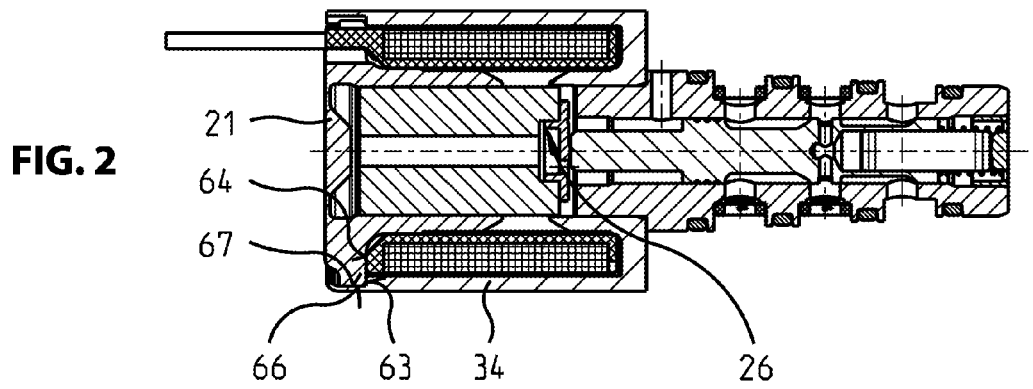
FIG. 2 illustrates the hydraulic transmission valve in a control position.

Thus, it is assured in spite of the high axial force of the anchor 22 that the entire anchor stroke from the basic position according to FIG. 1 through a control position according to FIG. 2 until the anti-stick disc contacts according to FIG. 3 has a linear force/distance diagram.

The transversal forces acting from the anchor 22 upon the pole tube are very small. This is facilitated through combining plural configuration details. Thus, on the one hand side, the anchor 22 is separated from the pole tube 7 with a chemically applied separation layer 57 for magnetic separation. The separation layer 27 is a so-called chemical nickel plating. The separation layer 57 has a thickness of 0.045 mm.

Thus, the anchor 22, in order to produce the separation layer 57, is inserted into a bath before installation and is chemically nickel plated, in particular in the portion of the enveloping surface 80 and the rear face 58 of the anchor 22. In order to form an even separation layer 57 without gaps, a support can support the anchor 22 in the chemical bath. The anchor 22 can be supported within the central borehole 25 and/or at the front faces 37, so that no nickel plating can occur at this place, or only a low value nickel plating can occur. In the central borehole 25, and at the front face 37, the separation layer 57 does not have to be provided either. It would also be possible to omit the separation layer 57 at the radial portion of the rear front face 58, wherein the radial portion never comes in contact with the base of the pole tube 7 anyhow.

Though the coaxial errors are kept very small through the described minimization of the number of components in the magnetic flux for producing the best possible coaxial arrangement between the pole cone 6 and the pole tube 7, however, also for this configuration, the inner diameter of the pole core cone 6 is slightly greater than the inner diameter of the pole tube 7. Thus, an annular air gap is created in addition to the separation layer 57, wherein the air gap separates the anchor 22 from the pole core cone 6.

The center arrangement of the borehole 25 in the anchor 22 is another measure for minimizing the magnetic transversal forces. If the borehole 25, operating between the receiving cavity 24 and the cavity 39 in front of the anchor for volume compensation, this would create magnetic field lines running through the anchor 22 with transversal forces being created as a consequence. The volume compensation is necessary when the anchor 22 is moved which changes the volumes of receiver cavity 24 and of the cavity 39.

Also the pinion 36 of the hydraulic bushing 29, wherein the pinion is an element that is involved in forming the pole core 5, is rotation symmetrical analogous to the anchor 22. In order to still facilitate volume compensation due to the plunger 30 penetrating the cavity 29 and exiting therefrom again, a borehole 40 for passing the plunger 30 through is expanded far enough so that a sufficiently large annular cavity 41 is provided in order for hydraulic oil to pass through without flow losses. A transversal borehole 42 extends from this annular cavity 41, wherein the transversal borehole runs the hydraulic oil out of the hydraulic bushing 29 or into the hydraulic bushing 29. This transversal borehole 42 is arranged outside of the pole core 5 so that it cannot load the magnetic field asymmetrically so that the transversal forces are kept small.

During assembly, the pole flange 13 is axially and radially loaded against the housing 4 due to the folding of the housing 4 about the pole flange 13. Since the anchor 22 is supported exclusively in the pole tube 7, also the anchor 22 is oriented against the housing 4 or the pole core cone 6 integrally configured in one piece with the housing 4. The coaxial arrangement between the pole core cone 6 and the anchor 22 significantly determines the transversal forces. Thus, the forces during folding are very large. Compared thereto, the thickness of the sleeve 10 is very small.

Thus, the sleeve 10 does not provide a centering of the pole core cone 6 relative to the pole tube 7 or it provides a centering that is dimensionally negligible. Thus it is the function of the sleeve 10 instead to minimize air inclusions in the hydraulic oil within the electromagnetic component 3. Such hydraulic inclusions namely can otherwise negatively influence the hydraulic damping when moving the anchor 22 back and forth. The sleeve 10 seals the cavity 29 and an annular cavity 43 in axial direction between the pole core cone 6 and a pole tube cone 9 only in an insufficient manner against a flow through of hydraulic oil. However, the sleeve prevents that air can accumulate within the sleeve 10 when filling the electromagnetic component 3 for the first time with hydraulic oil through the transversal borehole 42. Namely such air is enclosed about the support element 17 and is kept on the outside through the sleeve 10. Thus, also the initial checking of the transmission valve 1 can be performed under realistic environmental conditions.

The hydraulic component 2 includes a hydraulic piston 50 which is integrally configured with the plunger 30. The hydraulic piston 50 is supported axially movable within the hydraulic bushing 29. Thus, the hydraulic piston 50 is movable against the force of a compression coil spring 51. The hydraulic piston 50 includes two circumferential annular grooves 52, 53. Through the rear annular groove 52, a supply pressure of a supply connection P can be transmitted to an operating connection A when the hydraulic piston 50 is disposed in the position illustrated in FIG. 3 where it is displaced by a maximum amount against the force of the compression coil spring 51.

However, when the hydraulic piston 50 is in the basic position according to FIG. 1 since no sufficiently large voltage is applied to the coil 14, the hydraulic oil is run from the operating connection A to the tank outlet T.

Figure 4:
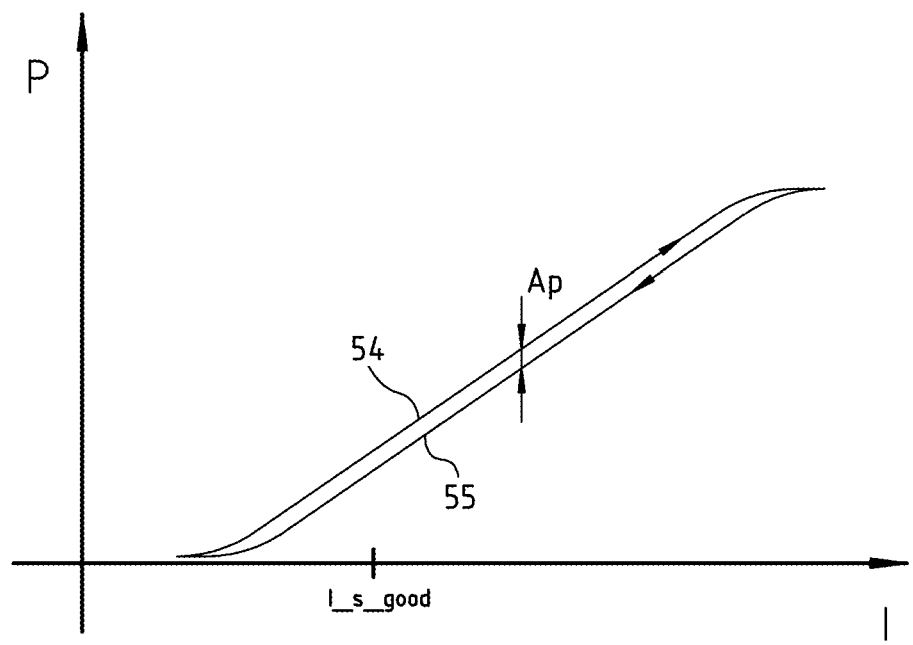
FIG. 4 illustrates a diagram of a hydraulic pressure at an operating connection over a current I for the transmission valve according to FIGS. 1 through 3.

FIG. 4 illustrates the hydraulic pressure p at the operating connection A plotted over the current I running through the coil 14 for the transmission valve 1 according to FIGS. 1 through 3. Thus, a hysteresis loop is created. Depending on the movement direction of the hydraulic piston 50, a motion occurs along two substantially parallel straight lines 54, 55 of the hysteresis loop. The distance of the two straight lines 54, 55 in ordinate direction is designated as hysteresis $\Delta p$. The hysteresis $\Delta p$ is determined by three variables:

1. The flow force of the two hydraulic connections which, besides the type of hydraulic oil, also depends from the temperature of the hydraulic oil or its viscosity.
2. The magnetic hysteresis which is a function of the material selected.
3. The different frictions which are significantly influenced by the transversal forces besides being influenced by the friction coefficient of the material pairings.

The compression coil spring 51, contrary to the recited variables, only plays a subordinate role due to the very small spring force.

The smaller the hysteresis $\Delta p$ or the less the two straight lines 54, 55 are offset from one another in ordinate direction, the better the transmission valve 1 can be regulated at a particular point.

Figure 5:
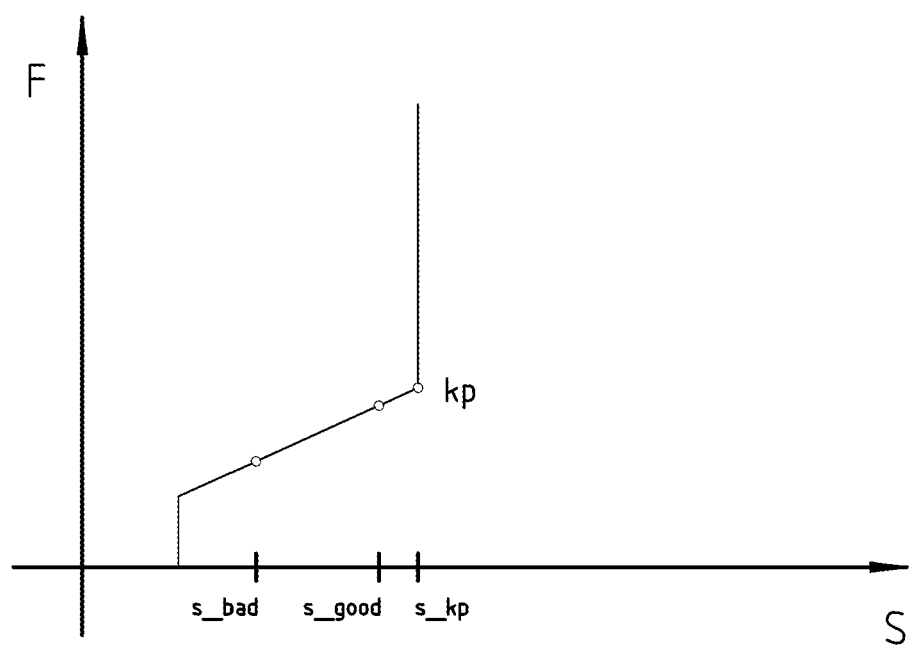
FIG. 5 illustrates for a lamellar clutch the contact force of the lamellar clutch over the travel of the lamellar clutch a diagram for using the transmission valve according to FIG. 1 through 3.

This is advantageous for the preferred application of the transmission valve 1 when controlling friction clutches. In particular, lamellar clutches have a defined kiss point kp as illustrated in the subsequently described diagram according to FIG. 5.

For this purpose, the diagram shows the force F impacting a hydraulic actuator of the lamellar clutch over the travel s of the lamellar clutch. The torque that is transferrable by the lamellar clutch is directly proportional to this force F. The lamellar clutch includes two packets of lamellas. The outer lamellas form one packet of lamellas. The inner lamellas form the other packet of lamellas. The outer lamellas are supported with their outer diameters axially movable and torque proof at the transmission shaft to be coupled. The inner lamellas are supported with their inner diameters torque proof and axially movable at the other transmission shaft to be coupled. The lamellas of a lamella packet or of both lamella packets are separated from one another with springs. These springs can be configured for example as disc springs or compression coil springs. The lamellas of the lamella clutch have a small amount of undulation.

When the transmission valve 1 conducts the supply pressure from the supply connection P through the operating connection A to a pressure chamber of the hydraulic actuator of the lamella clutch, the pressure in the pressure chamber increases rapidly until the preload of the springs is overcome. The pressure multiplied with the surface of the hydraulic actuator yields the force F. This force F increases over a distance $\Delta s1$ in a linear manner. When the so-called kiss point kp is reached, the outer lamellas and the inner lamellas contact one another directly. Thus, the force F increases rapidly. In order for a passenger not to perceive a comfort reduction, the regulation at this kiss point kp has to be of high quality. This however, as illustrated in FIG. 4, is only possible when the hysteresis $\Delta p$ is small. For a typical application of a lamella clutch, a hysteresis $\Delta p<0.5$ bar has proven to be comfortable.

The transmission valve 1 with a good or small hysteresis $\Delta p$ namely facilitates moving both lamella packets very quickly over a distance s_good and to subsequently regulate them slowly up to the point s_kp. An inferior transmission valve would only have to be moved over the distance s_bad so that a very long distance would still have to be covered until reaching the kiss point.

The illustrated transmission valve 1 has a high level of robustness. This means that contaminant particles in the hydraulic oil cannot lead to a jamming of the transmission valve 1, since the axial forces are large enough so that the anchor 22 can always pull clear. This is the case for the separation layer thickness stated herein and the material pairings when the anchor 22 develops a force of at least 15 N for a current of I=1A.

Therefore, the transmission valve 1 is particularly suitable for controlling the pressure of a twin clutch of a twin clutch transmission or of the lamella clutch of an automatic planetary transmission.

Figure 6:
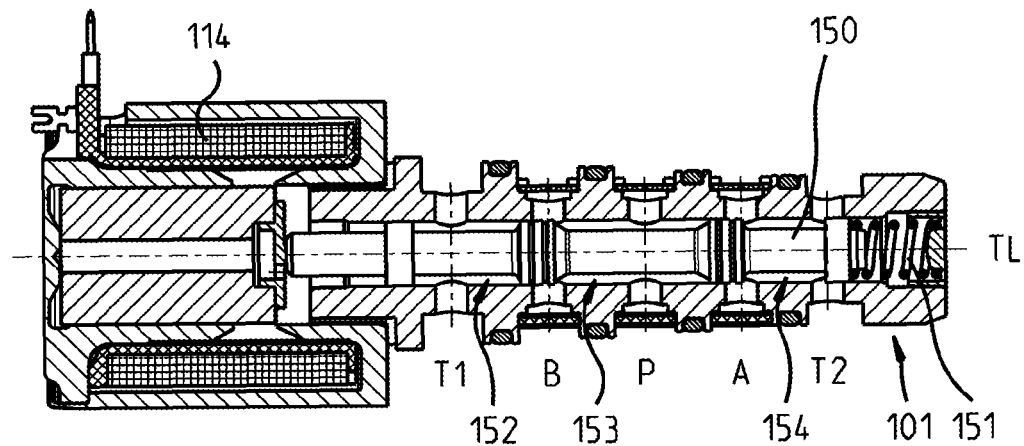
FIG. 6 illustrates a hydraulic transmission valve in a basic position in another embodiment.

Contrary to the pressure control valve according to FIG. 1 to FIG. 3, the transmission valve 101, according to FIG. 6, is a volume flow regulation valve. The volume flow regulation valve is provided for shifting gears in and out. In particular when the gears are provided with synchronous rings, similar boundary conditions apply as they were used supra for FIGS. 4 and 5. Also for synchronous rings, there is a friction moment transmission which should be regulated in a fine manner for reasons of comfort before the teethings of the synchronization come into engagement.

The transmission valve 101, however, has two operating connections A and B. Furthermore, the transmission valve 101 also has two tank outlets T1 and T2.

A hydraulic piston 150 includes two circumferential ring grooves 152, 153 and 154. Through the center ring groove 152, a volume flow of a supply connection P that is axially arranged between the two operating connection A, B can be run to the rear operating connection B when the hydraulic piston 150 is disposed in the base position illustrated in FIG. 6 for a coil 114 that is not loaded with current. The front operating connection A is run in this basic position over the forward ring groove 154 to the rear tank outlet T2.

Figure 8:
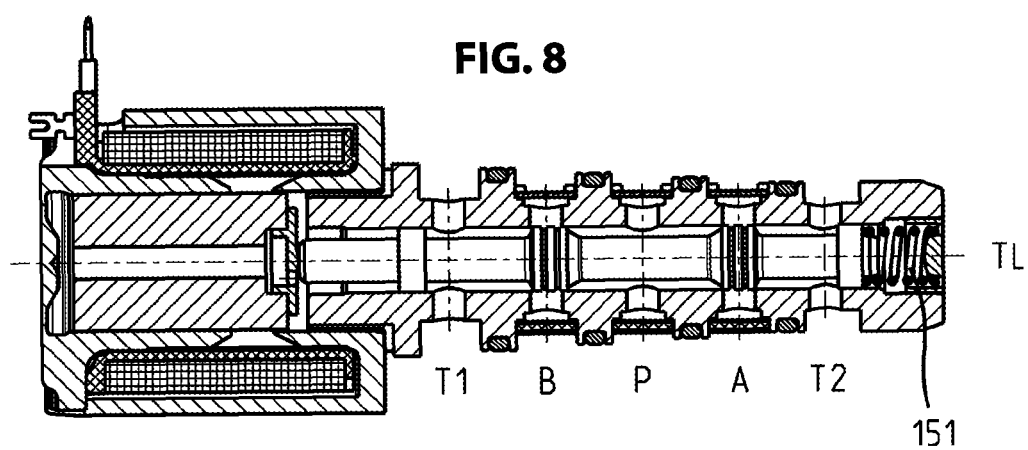
FIG. 8 illustrates the hydraulic transmission valve according to FIG. 6 in a contact position.

However, when a sufficient voltage is applied to the coil 14, the hydraulic piston 150 is in the maximum extended position against the spring force of the compression coil spring 151 according to FIG. 8. In this maximum reflected position, the hydraulic oil is run from the supply connection P to the front operating connection B. The rear operating connection B on the other hand side is run through the rear ring groove 152 to the front tank outlet T1.

Figure 7:
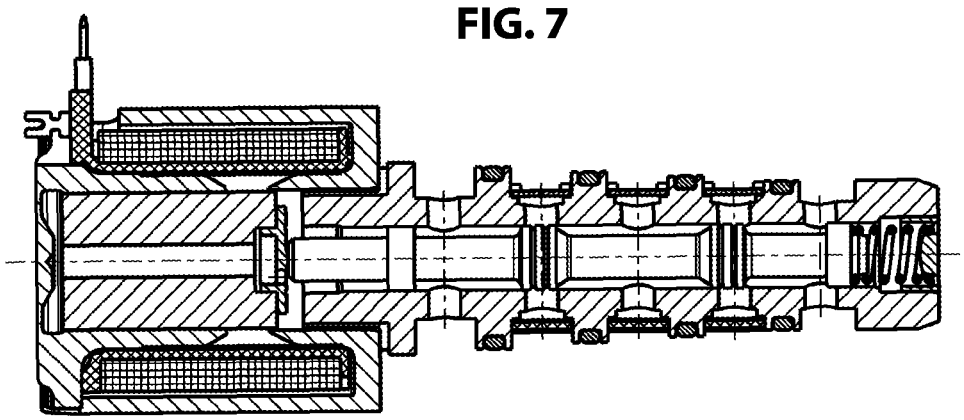
FIG. 7 illustrates the hydraulic transmission valve according to FIG. 6 in a control position.

Between these two extreme positions according to FIG. 6 and FIG. 8, there is the regulation position according to FIG. 7.

The hydraulic transmission valves do not have to be used in a twin clutch transmission. It is also possible to use the transmission valves in an automatic planetary transmission.

The anchor 22 is configured as a turned component. It is also possible to configure the anchor 22 as a sintered component.

In the portion of the connection 62, the housing 4 includes material with reduced thickness in order to facilitate a fold over without introducing excessive forces into the housing 4 which could influence the coaxial alignment of the pole tube 7 relative to the pole core cone in a negative manner. Thus the housing 62 is configured thinner in the portion of the connection 62 than in the remaining portion. Instead of a smaller wall thickness at this connection 62, alternatively also circumferential slots can be recessed so that tongues of the housing remain which can be bent more easily for establishing the connection 62.

Besides the illustrated connections, also other connections are feasible. For example, threaded connections are feasible which press the pole flange against the housing.

In an alternative embodiment, PTFE particles are inserted into the thin separation layer.

Depending on the embodiment of the separation layer, it is also feasible to omit the anti-stick disc. Chemical nickel plating, however, is not feasible for this purpose, since a layer thickness of 0.9 mm would be locally required at this front face. On the one hand side, tensions are generated for chemically nickel plated separation layers that are greater than 0.05 mm. On the other hand, the production time of the separation layer increases in a nonlinear manner with the layer thickness. Other in particular non-galvanic separation layers, however, are feasible. This would be, for example, a low friction lacquer.

In an alternative embodiment, the thin separation layer is not applied to the anchor, but to the inside to the pole tube.

The anti-stick disc made from non-magnetizable metal can be made in particular from austenitic steel. The anti-stick disc, however, can also be made from another non-magnetizable material like e.g. brass. A plastic material can also be used.

Instead of a lamella clutch, a dry clutch can also be used.

The inner diameter of the pole core cone does not have to be greater than the inner diameter of the pole tube. It is also feasible to make both inner diameters with the same size when both inner diameters are machined on the inside after assembly. In this case, the axial space between the pole core cone and the pole tube can be advantageously filled with a magnetically non-conducting material in order to prevent contaminations from being introduced at this location.

The described embodiments are only exemplary embodiments. A combination of the described features for different embodiments is also feasible. Further, in particular non-described features of the device components associated with the invention can be derived from the geometries of the device components illustrated in the drawing figures.

What is claimed is:

1. A hydraulic transmission valve, comprising:
    a magnetizable housing integrally formed in one piece with a pole core cone,
    wherein the housing includes a connection,
    wherein a pole tube is fixated at a magnetizable pole flange,
    wherein an anchor that is only supported in the pole tube is magnetically separated from the pole tube through a separation layer with a thickness of 0.06 mm to 0.1 mm,
    wherein the connection has an axial fit and a radial fit,
    wherein the pole flange includes a face to provide the axial fit,
    wherein the face contacts a contact surface of the housing that is aligned orthogonal to a longitudinal axis of the transmission valve,
    wherein the pole flange has an enveloping surface for providing the radial fit, and
    wherein the pole flange is inserted with the enveloping surface into a cylindrical recess of the housing.

2. The hydraulic transmission valve according to claim 1, wherein the pole flange and the pole tube are integrally configured in one piece.

3. The hydraulic transmission valve according to claim 1,
    wherein a coil is arranged radially outside of a non-magnetizable sleeve, and
    wherein the sleeve is placed on the one hand side onto an annular bar of the pole core cone and on the other hand side onto the pole tube, so that an installation space of the coil is separated from an anchor cavity within the sleeve that is filled with hydraulic oil.

4. The hydraulic transmission valve according to claim 1, wherein the housing is folded about the pole flange.

5. The hydraulic transmission valve according to claim 1,
    wherein the pole flange has recesses through which electrical conductors are run for applying a voltage to a coil,
    wherein the coil is defined on a radial inside by a support element made from plastic material, and
    wherein the support element is placed in a coaxial manner onto the pole tube and the annular bar on the one hand side in the portion of the pole core and on the other hand side in the portion of the pole tube.

6. The hydraulic transmission valve according to claim 1, wherein the separation layer is applied to the anchor.

7. The hydraulic transmission valve according to claim 1, wherein the separation layer is a chemical nickel coating.

8. The hydraulic transmission valve according to claim 1, wherein the separation layer is galvanically applied.

9. The hydraulic transmission valve according to claim 1, wherein the pole tube has a pole tube cone at an end oriented towards the pole core cone.

10. The hydraulic transmission valve according to claim 1, wherein the anchor has a central borehole.

11. The hydraulic transmission valve according to claim 1, wherein the anchor is separated through the separation layer at an enveloping surface of the anchor for preventing transversal forces, and wherein the anchor is separated through the separation layer at a face of the anchor oriented towards a magnetizable base of the pole tube for preventing magnetic sticking.

12. The hydraulic transmission valve according to claim 1, wherein the transmission valve includes a magnetizable hydraulic bushing which is inserted into an annular bar which extends coaxial with the longitudinal axis of the transmission valve from the housing in a direction oriented towards a center of the electromagnetic component and which terminates in the pole core cone.

13. The hydraulic transmission valve according to claim 1, wherein the housing has a reduced material thickness in the portion of the connection.

14. The hydraulic transmission valve according to claim 1, wherein an inner diameter of the pole core cone is slightly larger than an inner diameter of the pole tube so that an annular air gap is generated in addition to the separation layer, wherein the annular gap separates the anchor from the pole core cone.

15. A hydraulic transmission valve, comprising:
a magnetizable housing integrally formed in one piece with a pole core cone,
wherein the housing includes a connection,
wherein a pole tube is fixated at a magnetizable pole flange,
wherein an anchor that is only supported in the pole tube is magnetically separated from the pole tube through a separation layer,
wherein the connection has an axial fit and a radial fit,
wherein the pole flange includes a face to provide the axial fit,
wherein the face contacts a contact surface of the housing that is aligned orthogonal to a longitudinal axis of the transmission valve,
wherein the pole flange has an enveloping surface for providing the radial fit, and
wherein the pole flange is inserted with the enveloping surface into a cylindrical recess of the housing.

16. The hydraulic transmission valve according to claim 15,
wherein a coil is arranged radially outside of a non-magnetizable sleeve, and
wherein the sleeve is placed on the one hand side onto an annular bar of the pole core cone and on the other hand side onto the pole tube, so that an installation space of the coil is separated from an anchor cavity within the sleeve that is filled with hydraulic oil.

17. The hydraulic transmission valve according to claim 15, wherein the separation layer is applied to the anchor.

18. The hydraulic transmission valve according to claim 15, wherein the separation layer is a chemical nickel coating.

19. The hydraulic transmission valve according to claim 15, wherein the separation layer is galvanically applied.

\* \* \* \* \*